United States Patent
Kim (10) Patent No.: US 6,956,811 B2
(45) Date of Patent: Oct. 18, 2005

(54) OPTICAL RECORDING AND/OR REPRODUCING APPARATUS

(75) Inventor: Young-Sik Kim, Yongin (KR)

(73) Assignee: LG Electronics Inc., Seoul (KR)

( * ) Notice: Subject to any disclaimer, the term of this patent is extended or adjusted under 35 U.S.C. 154(b) by 378 days.

(21) Appl. No.: 10/307,837

(22) Filed: Dec. 2, 2002

(65) Prior Publication Data

US 2003/0103440 A1 Jun. 5, 2003

(30) Foreign Application Priority Data

Nov. 30, 2001 (KR) .............................. 10-2001-0075514

(51) Int. Cl.$^7$ ............................................... G11B 7/00
(52) U.S. Cl. ....................................................... 369/300
(58) Field of Search .......................... 369/300, 112.24; 360/114

(56) References Cited

U.S. PATENT DOCUMENTS 6,055,222 A * 4/2000 Knight .................... 369/13.13
6,845,077 B2 * 1/2005 Oohchida et al. ...... 369/112.09

FOREIGN PATENT DOCUMENTS

| JP | 6215413 | 8/1994 |
| JP | 11016195 | 1/1999 |
| JP | 11259884 | 9/1999 |
| JP | 11/328685 | 11/1999 |
| JP | 11/328686 | 11/1999 |
| JP | 2000067545 | 3/2000 |
| JP | 2000276805 | 10/2000 |
| JP | 2001216669 | 8/2001 |
| JP | 2001-297408 | 10/2001 |
| JP | 2001-297457 | 10/2001 |
| JP | 2001-297463 | 10/2001 |
| JP | 2001319369 | 11/2001 |
| KR | 2000-22892 | 4/2000 |

* cited by examiner

Primary Examiner—George Letscher
(74) Attorney, Agent, or Firm—Lee, Hong, Degerman, Kang & Schmadeka

(57) ABSTRACT

In an optical recording/reproducing apparatus, the apparatus includes a moving unit moving above a recording medium by operation of a driving unit; a slider fixedly installed at a free end of the moving unit; a head lens unit including an objective lens installed at a top surface of the slider and a conversing lens installed below the objective lens in order to converge light passing the objective lens above the recording medium; a beam path conversion unit having a selection surface being arranged at the upper portion of the objective lens vertical to an optical axis of the objective lens and transmitting only light beam proceeding toward an optical axis direction of the objective lens; and an optical unit having a radiating unit installed at the moving unit, generating and transmitting light to be irradiated onto the recording medium through the beam path conversion unit and the head lens unit and a light receiving unit for sensing light reflected upon the recording medium.

17 Claims, 6 Drawing Sheets

OPTICAL RECORDING AND/OR REPRODUCING APPARATUS

BACKGROUND OF THE INVENTION

1. Field of the Invention

The present invention relates to an optical recording/reproducing apparatus.

2. Description of the Related Art

As a recording medium for storing a large amount of data, a magnetic disc such as a HDD using a magnetic method, an optical disc such as a CD or DVD using an optical method and a photomagnetic disc, etc. using a photomagnetic effect are used.

The optical disc using the optical method has to have a small bit (bit recording mark) size and a narrow track width in order to have a high-density recording capacity. However, because a spot size of light collected onto a disc so as to form a bit onto a recording layer thereon is restricted by diffraction limit, there is limit to improve a recording density.

Trends toward large storage in recording medium needs a new optical recording/reproducing method capable of overcoming the limit of the conventional optical recording/reproducing method. Recently, researches on near field recording/reproducing using a near field capable of improving a recording capacity epochally have increased.

Principals of the near field optical recording/reproducing will be described as follows. In light incident to a lens at an angle not less than a critical angle of the lens, when the light proceeds from an optically dense portion to an optically rare portion in a refractive index, the light is total-reflected. Herein, by the total reflection of the light, light having very low brightness exists on the surface of the lens, it is called an evanescent wave. By using the evanescent wave, it is possible to have high resolving power that could not have in the conventional far field due to absolute limit, namely, diffraction limit occurred by a light diffraction phenomenon.

A near field optical recording/reproducing instrument generates an evanescent wave on the surface of a lens by total-reflecting light in the lens, and accordingly data can be recorded and reproduced by coupling the evanescent wave to a disc.

Figure 1:
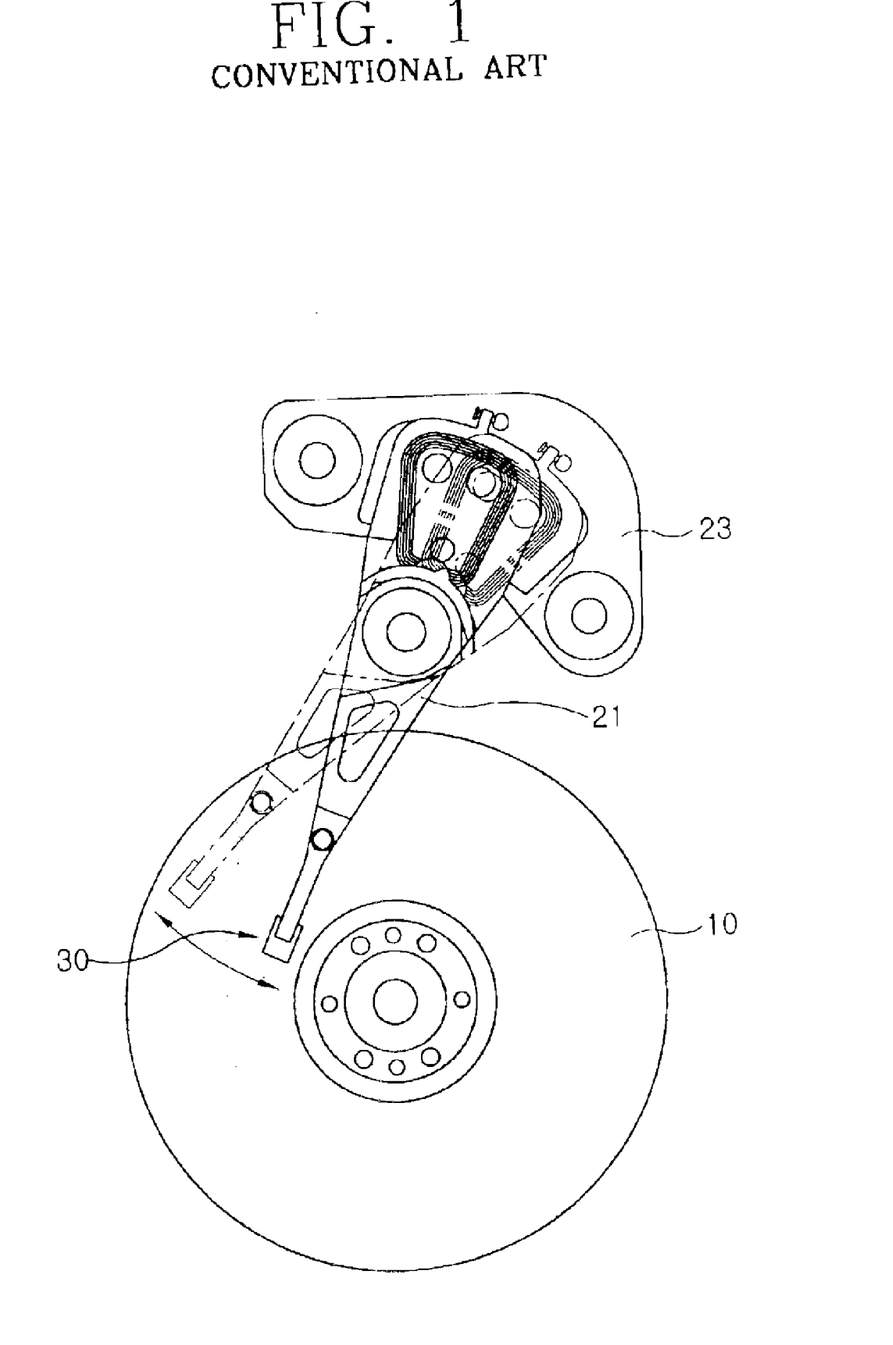
FIG. 1 is a plan view illustrating the conventional near field optical recording/reproducing apparatus.

As depicted in FIG. 1, the conventional near field optical recording/reproducing apparatus includes a swing arm 21 installed so as to perform a reciprocating rotation; an actuator 23 for rotationally driving the swing arm 21; and a head 30 installed at the end of the swing arm 21 in order to scan tracks of a disc 10 by being lifted above the disc 10 by air dynamic pressure.

Figure 2:
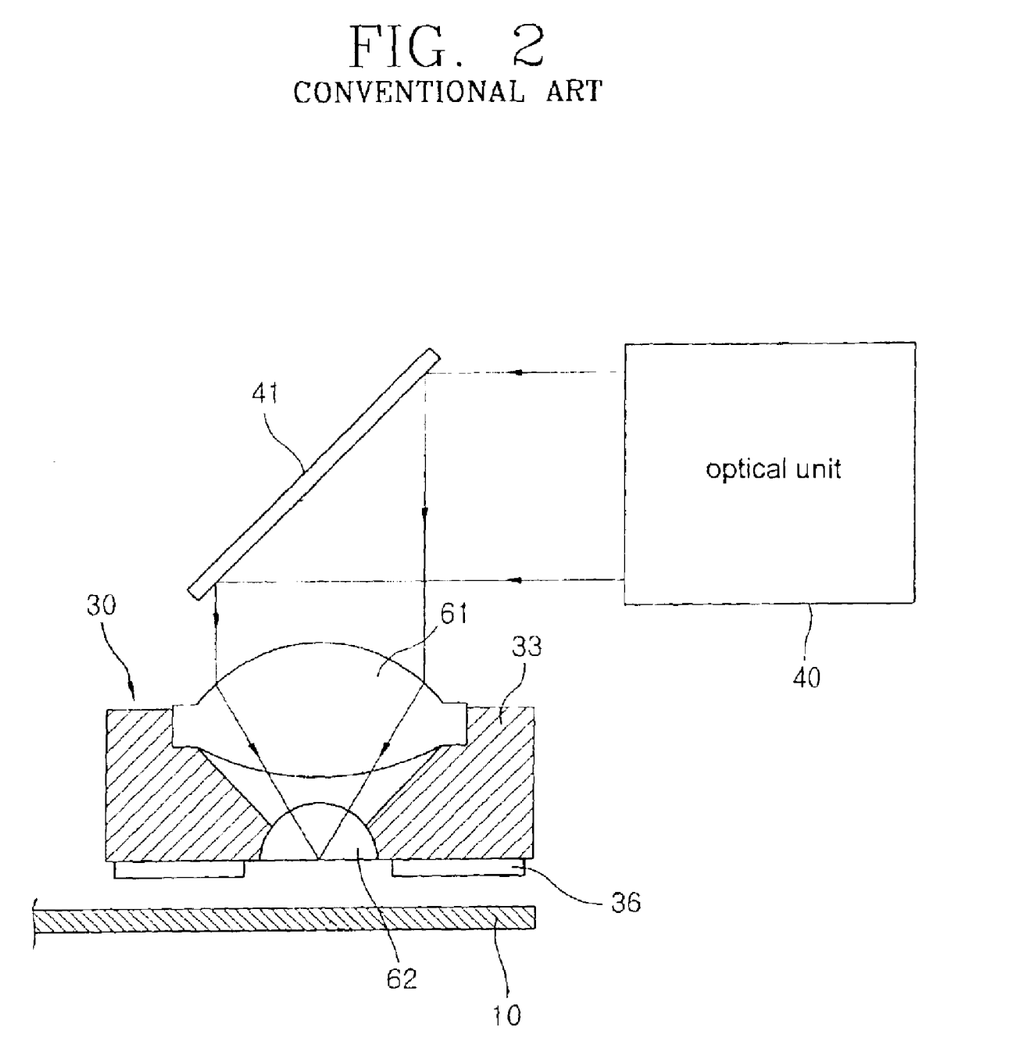
FIG. 2 is a partial-sectional view illustrating an optical unit and a head of the conventional near field optical recording/reproducing apparatus in FIG. 1.

As depicted in FIG. 2, the head 30 includes a lens unit having an objective lens 61 and a converging lens 62 separated from the objective lens 31 by a focus distance of the objective lens 31 and a slider 33 for installing the lens unit.

It is general to use a solid immersion lens (SIL) or a solid immersion mirror (SIM) as the converging lens 62.

In addition, in order to lift the slider 33 above the disc 10, an air bearing system (ABS) 36 for generating air pressure to the disc 10 and the slider 33 is installed at the bottom surface of the slider 33.

And, a radiating unit (not shown) for generating laser light in order to record/reproduce data onto the disc 10 as a recording medium, a light receiving unit (not shown) for sensing light reflected upon the disc 10 and an optical unit 40 for transmitting light to the head 30 are fixedly installed at the upper portion of the head 30.

A laser diode is used as the radiating unit, a photo diode is used as the light receiving unit, and the optical unit includes a beam splitter and a collimating lens, etc.

Herein, because light (L) to pass the objective lens 61 has to be vertically incident on the objective lens 61, a transmission path of the light (L) has to be bent, for that, a reflection mirror 41 or a prism, etc. is used.

In the conventional optical recording/reproducing apparatus, according to rotation of the swing arm 21 by operation of the actuator 23, the head 30 is moved above the disc 10.

Herein, the head 30 is in the flying state by the ABS 36 installed at the bottom surface of the slider 33, and data is recorded/reproduced onto/from the disc 10 according to the movement of the head 30.

The recording/reproducing process of the optical recording/reproducing apparatus will be described in more detail. In the process, the radiating unit generates laser light (L), the laser light (L) is transmitted to the reflection mirror 41 through the optical system, is incident on the objective lens 61 and is incident on the disc 10 through the converging lens 62.

According to the laser light incident on the disc 10, data is recorded on the surface of the disc 10. On the contrary, according to surface conditions of the disc 10, the laser light (L) is reflected, is transmitted to the light receiving unit through the converging lens 62, the objective lens 61, the reflection mirror 41 and the optical system, and accordingly data recorded onto the disc 10 is reproduced.

However, in the conventional optical recording/reproducing apparatus, when the optical unit 40 is installed at the actuator 23 and the head 30 includes only the reflection mirror 41, the objective lens 61 and the converging lens 62, because the laser light (L) generated in the radiating unit or light to be transmitted to the light receiving unit 40 has to pass above the swing arm (21), etc., optical errors may occur due to the long progress path, in addition, installation of the optical unit 40 is intricate.

In the meantime, in order to solve the above-mentioned problems, when the optical unit 40 is installed onto the slider 33, because a thickness and load of the slider 33 are increased, driving power of the swing arm 21 has to be increased, it is difficult to control accurately driving speed thereof due to that, and accordingly a performance of the optical recording/reproducing apparatus may be lowered.

In addition, because the slider 33 abutting above the disc 10 in moving may vibrate up and down according to the surrounding conditions, transmission error of laser light may occur due to the vibration.

SUMMARY OF THE INVENTION

In order to solve the above-mentioned problem, it is an object of the present invention to provide an optical recording/reproducing apparatus which is capable of maintaining a focus of an objective lens and a converging lens onto a disc stably regardless of a position of a radiating unit and a light receiving unit.

It is another object of the present invention to provide an optical recording/reproducing apparatus which is capable of improving driving characteristics epochally by installing a radiating unit for generating laser light and a light receiving unit for sensing laser light separately.

In order to achieve the above-mentioned object, an optical recording/reproducing apparatus in accordance with the present invention includes a moving unit moving above a recording medium by operation of a driving unit; a slider fixedly installed at a free end of the moving unit; a head lens unit including an objective lens installed at a top surface of the slider and a conversing lens installed below the objective lens in order to converge light passing the objective lens above the recording medium; a beam path conversion unit having a selection surface arranged at an upper portion of the objective lens arranged vertical to an optical axis of the objective lens in order to transmit only light beam proceeding toward an optical axis direction of the objective lens; and an optical unit having a radiating unit installed at the moving unit, generating and transmitting light to be irradiated onto the recording medium through the beam path conversion unit and the head lens unit and a light receiving unit for sensing light reflected upon the recording medium.

In addition, in an optical recording/reproducing apparatus including an objective lens and a converging lens arranged below the objective lens to converge light onto a recording medium, an optical recording/reproducing apparatus in accordance with the present invention includes a beam path conversion unit having a selection surface arranged vertical to an optical axis of an objective lens in order to transmit only light beam proceeding toward the optical axis direction of the objective lens.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiment of an optical recording/reproducing apparatus in accordance with the present invention will be described with reference to accompanying drawings.

As depicted in FIGS. 3 to 6, the optical recording/reproducing apparatus in accordance with the present invention includes a moving unit 121 moving above a recording medium 100 by operation of a driving unit 123; a slider 130 fixedly installed at a free end of the moving unit 121; a head lens unit 160 including an objective lens 162 installed at a top surface of the slider 130 and a conversing lens 162 installed below the objective lens 161 in order to converge light passing the objective lens 162 onto a recording medium 100; a beam path conversion unit 150 having a selection surface 151 being arranged at the upper portion of the objective lens 161 vertical to an optical axis of the objective lens 161 and transmitting only light beam proceeding toward an optical axis direction of the objective lens 161; and an optical unit 110 having a radiating unit 111 installed at the moving unit 123, generating and transmitting light to be applied onto the recording medium 100 through the beam path conversion unit 150 and the head lens unit 160 and a light receiving unit 112 for sensing light reflected on the recording medium 100.

Figure 3:
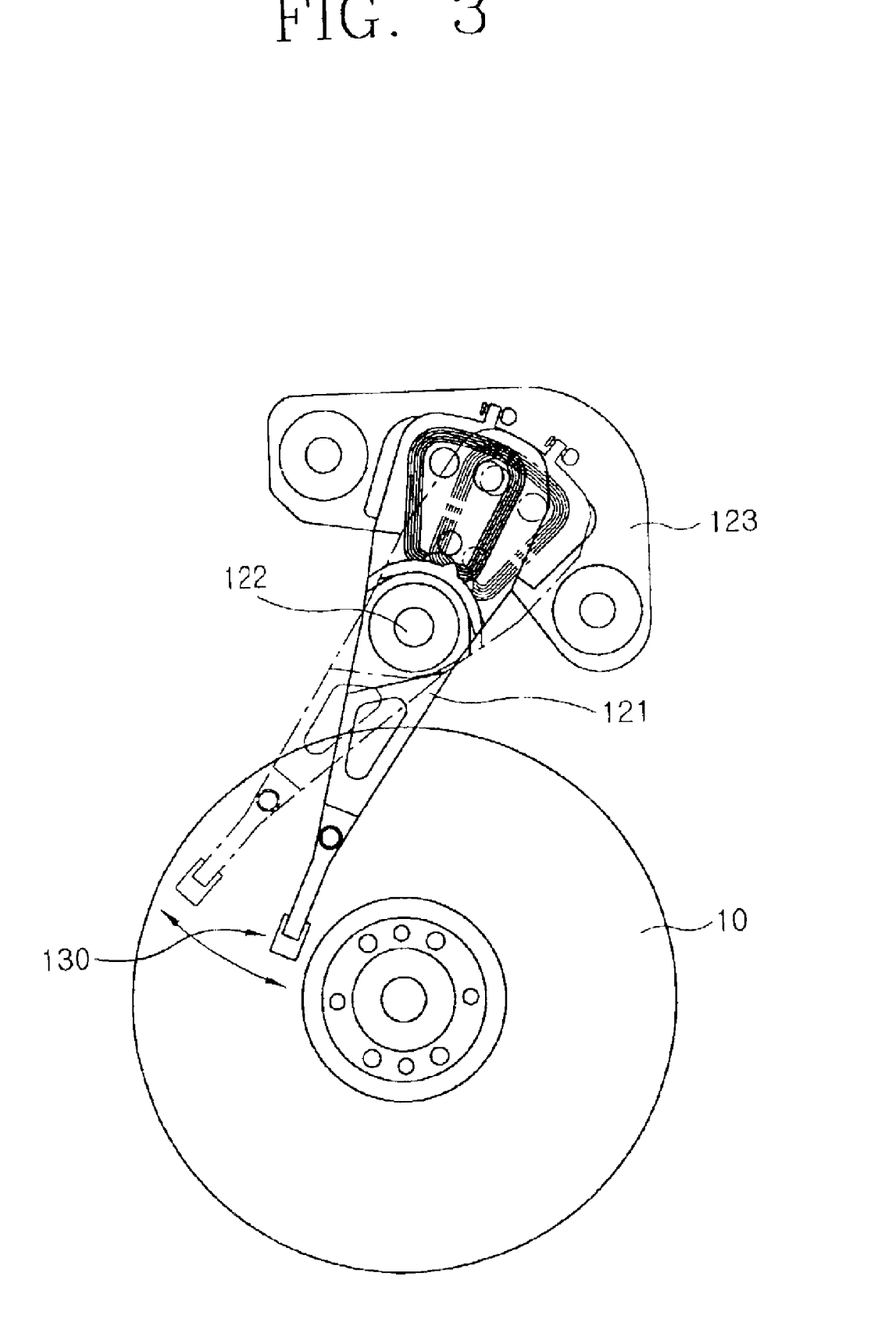
FIG. 3 is a plan view illustrating an optical recording/reproducing apparatus in accordance with the present invention.

Alike a HDD (hard disk drive), the driving unit 123 and the moving unit 121 respectively use an actuator for rotating and a swing arm rotational within a certain angle.

Figure 4A:
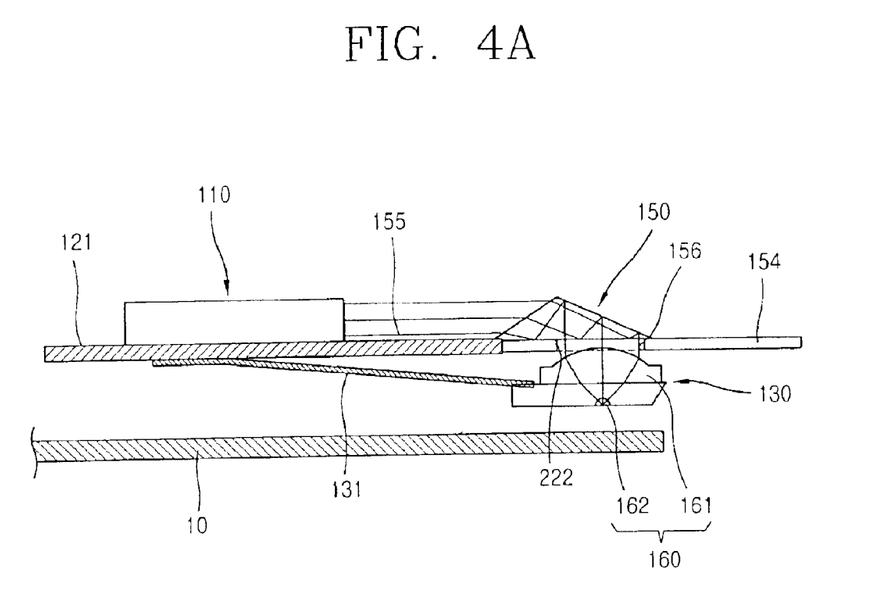
FIGS. 4A, 4B and 4C are partial-sectional views illustrating part of the optical recording/reproducing apparatus in FIG. 3.

The objective lens 161 is a lens having a certain focus distance, and the converging lens 162 is a solid immersion lens (SIL) or a solid immersion mirror (SIM).

The slider 130 is fixedly installed at a free end of the moving unit 123 by a support member 131. The support member 131 is fixedly installed at the lower portion of the moving unit 121 by a combining means such as a screw or adhesive means.

Figure 5:
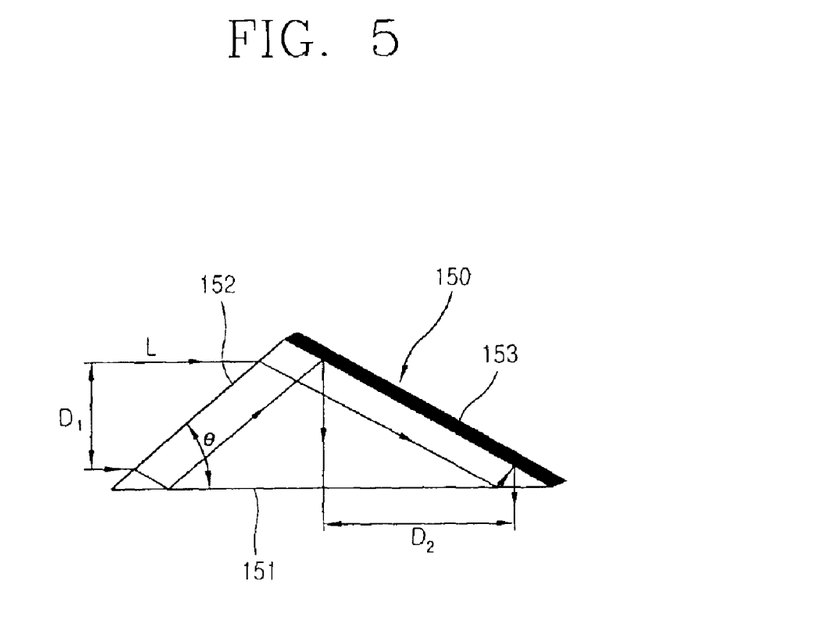
FIG. 5 is a sectional view illustrating a construction of a light path converting unit of the optical recording/reproducing apparatus in FIG. 3.

As depicted in FIG. 5, the beam path conversion unit 150 is a trigonal prism and has a first surface 151 as the selection surface 151 for transmitting only light vertically incident thereon, a second surface 152 for passing incident light and a third surface 153 for reflecting totally incident light (L).

In more detail, when laser light (L) transmitted from the optical unit 110 is incident on the second surface 152, because the light (L) incident on the second surface 152 is not vertically incident on the surface 151, the light (L) is reflected upon the third surface 153, the third surface 153 totally reflects the light (L), the light (L) is incident on the first surface 151, herein, only vertically incident light transmits through the first surface 151 and is incident on the objective lens 161.

And, laser light reflected upon the disc (recording medium) 100 is incident on the beam path conversion unit 150 by passing the converging lens 162 and the objective lens 161 (reverse-proceeding), passes the first surface 151 and proceeds toward the optical unit 110.

And, the beam path conversion unit 150 satisfies the following Equation $$\frac{D_1}{D_2} = \frac{\sqrt{n^2 - \cos^2\theta}}{n\sin\theta}$$

Herein, $\theta$ is an angle of the first surface 151 with the second surface 152, $D_2$ is a diameter of light (L) incident on the second surface 152, $D_1$ is a diameter of light transmitting the first surface 151, and n is a refractive index of the beam path conversion unit 150.

Accordingly, according to conditions of the objective lens 161 and the converging lens 162 of the head lens unit 160 such as a size of a spot formed onto the disc 100, in more detail, according to a $$\frac{D_1}{D_2}$$

value, the $\theta$ value is determined.

In addition, it is possible to decrease the $\theta$ value by adjusting n, $D_1$ and $D_2$ values, and a thickness of the optical recording/reproducing apparatus can be reduced in the end.

In addition, a section of light passing optical fiber has usually an oval shape, in transmission of laser light by using optical fiber arranged between the optical unit 110 and the beam path conversion unit 150. So, by adjusting a θ value, namely, a $$\frac{D_1}{D_2}$$

value, it is possible to form a section of light transmitting the second surface 152 as a circular shape.

Figure 4B:
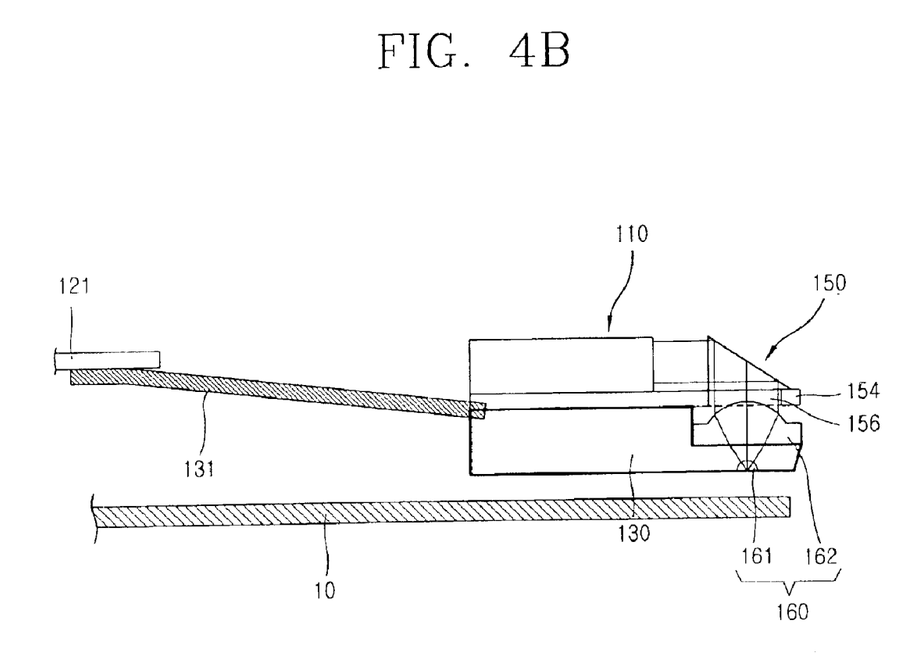

In the meantime, the beam path conversion unit 150 is fixedly installed at the upper portion of the objective lens 161 by a fixation member 154, as depicted in FIG. 4A, besides the support member 131 fixing the slider 155, the fixation member 154 can be fixedly installed at the free end of the moving unit 121 by using a connection member 155 as depicted in FIG. 4B.

The fixation member 154 may be made of metal material but in order to facilitate installation of other electric devices, etc., it is also possible to be made of silicon wafer. In particular, as depicted in FIG. 4B, the optical unit 110 can be installed together with the fixation member 154.

When the fixation member 154 is made of a silicon wafer, it is possible to easily arrange a groove, a through hole and circuit device, etc. in order to install members. In more detail, by performing printing of a circuit on the surface of the silicon wafer, forming a groove for position selection of optical devices and combining the optical devices, the optical unit 100 and/or the beam path conversion unit 150 can be easily fabricated on a subminiature micro chip having small weight by a simple process.

And, the fixation member 154 has a light transmittance hole 156 corresponding to the objective lens 161 in order to make light passing the beam path conversion unit 150 incident on the objective lens 161.

Figure 4C:
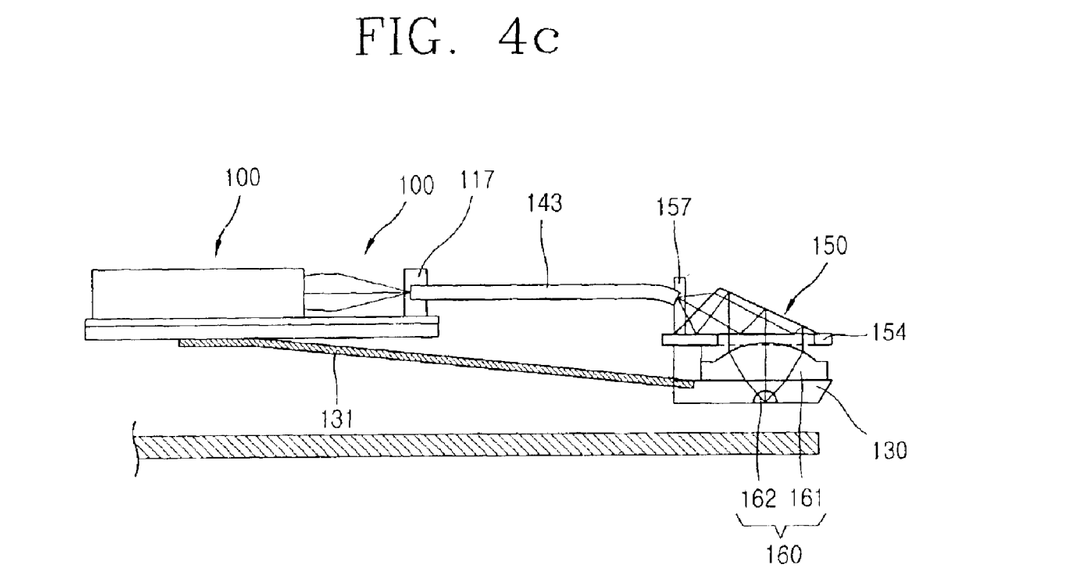

In the meantime, as depicted in FIG. 4C, the fixation member 154 can be fixedly installed at the top surface of the slider 130.

Figure 6:
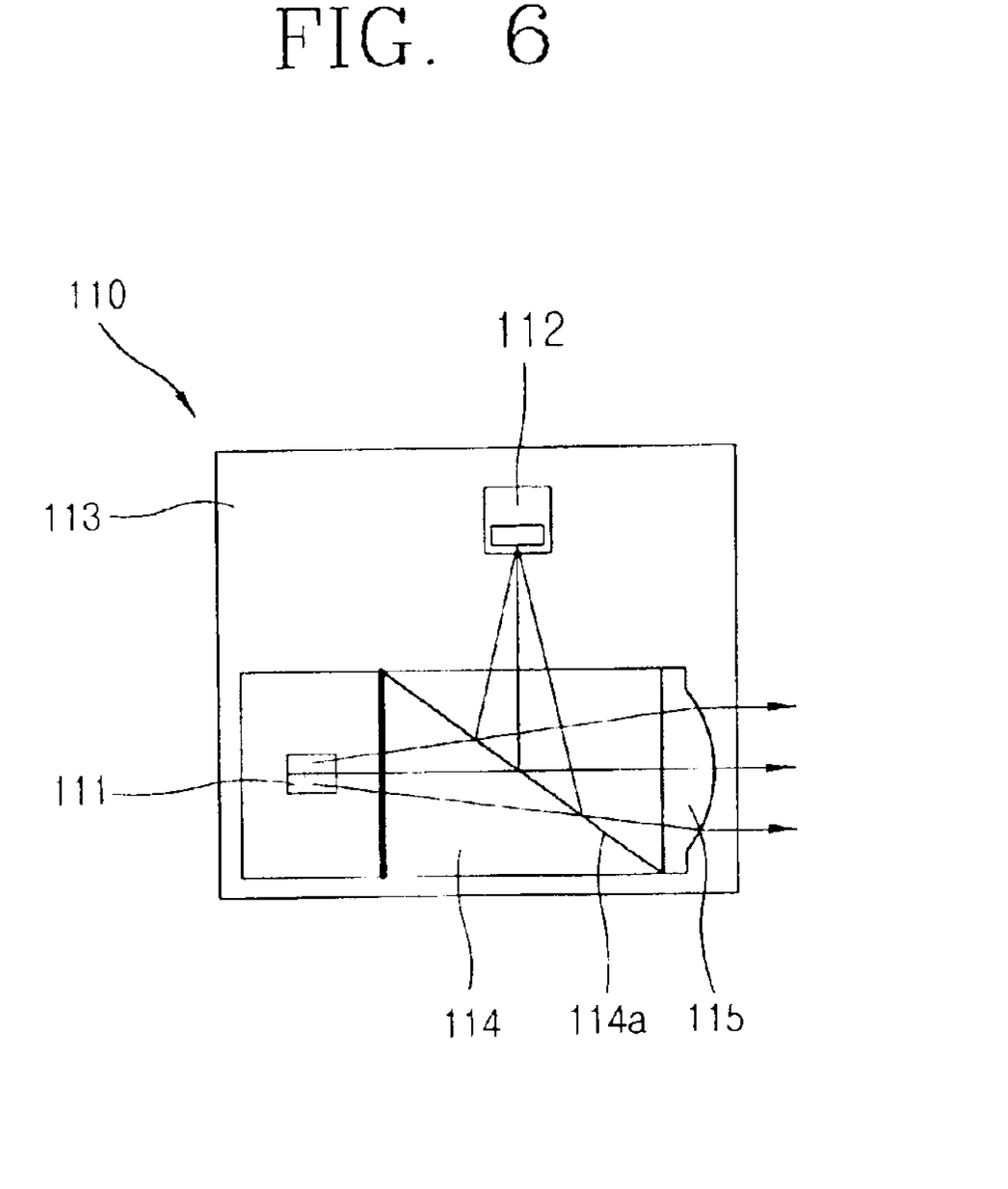
FIG. 6 is a conceptual view illustrating an optical unit of the optical recording/reproducing apparatus in FIG. 3.

As depicted in FIG. 6, the optical unit 110 includes an installation plate 113; a radiating unit 111 installed at a certain side of the installation plate 113; a beam splitter 114 arranged in the proceeding direction of laser light (L) generated from the radiating unit 111; a light receiving unit 112 placed at the upper portion of the beam splitter 114 and sensing light reflected by a reflection surface 114a of the beam splitter 114; and a collimating lens 115 being arranged next to the beam splitter 114 in the proceeding direction of laser light and converting light passing the beam splitter into parallel light.

The radiating unit 111 and the light receiving unit 112 use a laser diode and a photo diode respectively.

As depicted in FIG. 4B, the optical unit 110 can be fixedly installed onto the fixation member 154 at which the beam path conversion unit 150 is fixedly installed. In that case, the fixation member 154 is used as the installation plate 113.

In addition, as depicted in FIG. 4A, the optical unit 110 can be fixedly installed onto the swing arm 121 or on a rotational axis 122 of the swing arm 121 so as to abut on a rotational axis 122 of the swing arm 121, in particular, as depicted in FIG. 4C, for mutual transmission of laser light between the optical unit 110 and the beam path conversion unit 150, by using the optical fiber 143 for transmitting light, an installation position of the optical unit 110 can be freely determined.

Herein, in order to fix the optical fiber 143, optical fiber fixation members 117, 154 for fixing the optical fiber 143 are installed at the installation plate 113 and the fixation member 154 respectively. And, the converging lens 116 is installed between the optical unit 110 and the optical fiber 143 in order to irradiate light to the end of the optical fiber 143.

In particular, by determining an installation position of the optical unit 110 freely by using the optical fiber 143, there is no need to install the optical unit 110 on the slider side 130, load acting on the slider 130 can be reduced, and accordingly it is possible to reduce power consumption for operating the swing arm 121 including the slider 130 and facilitate the control thereof. In addition, by reducing required members arranged on the slider 130, a thickness of the slider 130 can be reduced, and accordingly it is possible to adapt actively thin and compact trends of electric equipment.

In addition, because light is transmitted to the beam path conversion unit 150 through the optical fiber 143, there is no need to fix positions of the optical unit 110 and the slider 130 with due regard to required conditions such as a straight arrangement and certain distance maintenance, etc., by making the support member 131 for supporting the slider 130 of material having bending elasticity, the slider 130 can actively react to vibration occurred in moving above the disc 100, and accordingly it is possible to maintain a focus uniformly above the disc 100 and reduce a light error due to vibration and distance variation, etc.

The optical recording/reproducing apparatus in accordance with the present invention can reduce light error occurrence possibility without affecting a driving speed and an accuracy of the swing arm, in addition, it can maintain a focus of light in spite of vibration of the slider 130.

What is claimed is:

1. An optical recording/reproducing apparatus, comprising:
   a moving unit moving above a recording medium by operation of a driving unit;
   a slider fixedly installed at a free end of the moving unit;
   a head lens unit comprising an objective lens installed at a top surface of the slider and a converging lens installed below the objective lens to converge light passing through the objective lens above the recording medium;
   a beam path conversion unit having a selection surface being arranged at an upper portion of the objective lens vertical to an optical axis of the objective lens and transmitting a light beam proceeding toward an optical axis direction of the objective lens; and
   an optical unit comprising a radiating unit installed at the moving unit for generating and transmitting light to be irradiated onto the recording medium through the beam path conversion unit, the head lens unit and a light receiving unit for sensing light reflected upon the recording medium, wherein the beam path conversion unit comprises a first surface as the selection surface, a second surface for passing incident light and a third surface for reflecting all incident lights, and
   wherein Equation $$\frac{D_1}{D_2} = \frac{\sqrt{n^2 - \cos^2\theta}}{n\sin\theta}$$

is satisfied, when an angle of the first surface with the second surface is θ, a diameter of light incident on the second surface is D2, a diameter of light transmitting the first surface is D1, and a refractive index of the beam path conversion unit is n.

2. The apparatus of claim 1, wherein the slider is fixedly installed at a free end of a support member fixedly installed at a free end of the moving unit.

3. The apparatus of claim 1, wherein the driving unit is an actuator for reciprocating-rotating the moving unit at a specified angle.

4. The apparatus of claim 1, wherein the moving unit is a swing arm reciprocating-rotating within a specified angle range.

5. The apparatus of claim 1, wherein the beam path conversion unit determines the θ value according to the $$\frac{D_1}{D_2}$$

value.

6. The apparatus of claim 1, wherein the beam path conversion unit is a trigonal prism.

7. The apparatus of claim 1, wherein the beam path conversion unit is installed at a fixation member fixedly installed at an upper portion of the objective lens.

8. The apparatus of claim 7, wherein the fixation member is a silicon wafer.

9. The apparatus of claim 7, wherein the fixation member is fixedly installed at the top surface of the slider and has a light transmittance hole corresponded to the objective lens.

10. The apparatus of claim 7, wherein the fixation member is fixedly installed at a free end of the moving unit and has a light transmittance hole corresponded to the objective lens.

11. The apparatus of claim 7, wherein the optical unit is installed onto the fixation member.

12. The apparatus of claim 1, wherein the optical unit is fixedly installed at the moving unit.

13. The apparatus of claim 1, wherein optical fiber is arranged between the optical unit and the beam path conversion unit in order to transmit light.

14. The apparatus of claim 13, wherein the slider is fixedly installed at a free end of the support member which is fixedly installed at the free end of the moving unit.

15. The apparatus of claim 14, wherein the support member has bending elasticity.

16. The apparatus of claim 1, wherein the converging lens is a solid immersion lens (SIL) or a solid immersion mirror (SIM).

17. An optical recording/reproducing apparatus, comprising:

a moving unit moving above a recording medium by operation of a driving unit;

a slider fixedly installed at a free end of the moving unit;

a head lens unit comprising an objective lens installed at a top surface of the slider and a converging lens installed below the objective lens to converge light passing through the objective lens above the recording medium;

a beam path conversion unit having a selection surface being arranged at an upper portion of the objective lens vertical to an optical axis of the objective lens and transmitting a light beam proceeding toward an optical axis direction of the objective lens; and an optical unit comprising a radiating unit installed at the moving unit for generating and transmitting light to be irradiated onto the recording medium through the beam path conversion unit, the head lens unit and a light receiving unit for sensing light reflected upon the recording medium, wherein the beam path conversion unit comprises a first surface as the selection surface, a second surface for passing incident light and a third surface for reflecting all incident lights, wherein the beam path conversion unit makes a section of light passing the first surface as a circular shape by adjusting the angle θ of the first surface with the second surface.

* * * * *